US012613129B2

(12) United States Patent
Mizuno et al.

(10) Patent No.: US 12,613,129 B2
(45) Date of Patent: Apr. 28, 2026

(54) TRUE PARTICLE VELOCITY WAVEFIELD PROCESSING IN FIBER OPTICS—PARTICLE MOTION SENSOR HYBRID ARRAY

(71) Applicant: Schlumberger Technology Corporation, Sugar Land, TX (US)

(72) Inventors: Takashi Mizuno, Sugar Land, TX (US); Joel Herve Le Calvez, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 178 days.

(21) Appl. No.: 18/766,160

(22) Filed: Jul. 8, 2024

(65) Prior Publication Data

US 2024/0361179 A1     Oct. 31, 2024

Related U.S. Application Data

(62) Division of application No. 17/211,429, filed on Mar. 24, 2021, now Pat. No. 12,031,857.

(51) Int. Cl.
| | |
|---|---|
| *G01V 8/16* | (2006.01) |
| *G01H 9/00* | (2006.01) |
| *G01V 1/22* | (2006.01) |

(52) U.S. Cl.
CPC ............. *G01H 9/004* (2013.01); *G01V 1/226* (2013.01); *G01V 8/16* (2013.01)

(58) Field of Classification Search
CPC ........... G01H 9/004; G01V 1/226; G01V 8/16
See application file for complete search history.

(56) References Cited

U.S. PATENT DOCUMENTS

| | | | |
|---|---|---|---|
| 9,523,790 B1 * | 12/2016 | Valishin | ................. E21B 47/07 |
| 2014/0150523 A1 | 6/2014 | Stokely et al. | |
| 2015/0300161 A1 | 10/2015 | Kamata | |
| 2019/0004195 A1 | 1/2019 | Hornman et al. | |
| 2020/0081145 A1 * | 3/2020 | Padhi | ..................... G01V 1/226 |
| 2020/0190973 A1 * | 6/2020 | Valishin | ................. G01V 1/226 |

FOREIGN PATENT DOCUMENTS

WO     2020242448 A1     12/2020

OTHER PUBLICATIONS

Extended Search Report issued in European Patent Application No. 22776353.9 dated Dec. 20, 2024, 9 pages.

(Continued)

*Primary Examiner* — Krystine E Breier
(74) *Attorney, Agent, or Firm* — Jeffrey D. Frantz

(57)     ABSTRACT

Systems and methods may be used to reconstruct particle velocity wavefields from coupling-calibrated fiber-optic data that subsequently enables physically valid construction of the particle velocity wavefields for a hybrid sensor array including both fiber-optic and particle motion sensors. These systems and methods may be used in a variety of borehole geophysical applications, such as structure and reservoir imaging, impedance inversion, attenuation tomography, micro-seismic fracture imaging, focal mechanism analysis, and so on. The systems and methods may also be used in other applications such as geothermal and $CO_2$ storage monitoring.

5 Claims, 6 Drawing Sheets

(56) References Cited

OTHER PUBLICATIONS

Eaid, M. V. et al., "Multiparameter seismic elastic full-waveform inversion with combined geophone and shaped fiber-optic cable data", Geophysics, 2020, 85(6). 18 pages.

Daley, T.M., D.E. Miller, K. Dodds, P. Cook., and B.M. Vreifeld, 2016, Field testing of modular borehole monitoring with simultaneous distributed acoustic sensing and geophone vertical seismic profiles at Citronelle, Alabama: Geophysical Prospecting, 64, 1318-1334.

Egorov, A., J. Correa, A. Bona, R. Pevzner, K. Tertyshnikov, S. Glubokovskikh, V. Puzyrev, and B. Gurevich, 2018, Elastic full-waveform inversion of vertical seismic profile data acquired with distributed acoustic sensors. Geophysics, 83, (May-Jun. 2018) R273-R281.

Mateeva, A., J. Mestayer, B. Cox, D. Kiyashchenko, P. Wills, J. Lopez, S. Grandi, K. Hornman, P. Lumens, A. Franzen, B. Hill, and J. Roy, 2012, Advances in distributed acoustic sensing (DAS) for VSP: 82nd Annual Meeting, SEG, Expanded Abstracts, (5 pages) https://doi.org/10.1190/segam2012-0739.1.

Miller, D., M., Oristaglio, and G., Beylkin, 1987, A new slant on seismic imaging: Migration and integral geometry, Geophysics, 52, 943-964.

Miznuo, T., J. Le Calvez, D. Raymer, 2017, Abstract—Revision of an automated microseismic location algorithm for DAS—3C geophone hybrid array, American Geophysical Union Fall Meeting, S33B-2386 (1 page).

Mizuno, T., S. Leaney, J. Le Calvez, F. Naseer, and M. L. Khaitan, 2019, The significance of gauge length in particle velocity estimation from DAS data: VSP and microseismic cases: 89th Annual Meeting, SEG, Expanded Abstracts, 4869-4873.

International Search Report and Written Opinion issued in the PCT Application No. PCT/US2022/020858 dated Jun. 30, 2022, 9 pages.

* cited by examiner

TRUE PARTICLE VELOCITY WAVEFIELD PROCESSING IN FIBER OPTICS—PARTICLE MOTION SENSOR HYBRID ARRAY

CROSS-REFERENCE TO OTHER APPLICATIONS

This application is a Divisional of U.S. Non-Provisional application Ser. No. 17/211,429, entitled "TRUE PARTICLE VELOCITY WAVEFIELD PROCESSING IN FIBER OPTICS-PARTICLE MOTION SENSOR HYBRID ARRAY" filed Mar. 24, 2021, the disclosure of which is hereby incorporated herein by reference.

BACKGROUND

This disclosure relates to processing seismic data acquired using a hybrid sensor array including optical fiber sensors and particle motion sensors in a seismic acquisition environment.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Oil and gas exploration and production is a remarkably complex endeavor. A variety of surface and downhole measurement tools may be used to identify areas of a geological formation that may contain materials of interest, such as hydrocarbon reserves. A recent development of optical fiber-based seismic sensing technologies such as Distributed Acoustic Sensing (DAS) provide industries (e.g., oil and gas industry) with new options for seismic sensing. For example, in borehole seismic, the DAS provides a viable alternative to downhole particle motion sensor (e.g., geophone, accelerometer) arrays with high sensor count, flexible deployment, and long-term operation. However, unlike geophone-based acquisition systems, optical fiber-based acquisition systems may measure physical properties (e.g., strain, temperature) other than particle motions (e.g., velocities, accelerations), making it difficult to extract the seismic data of interest.

SUMMARY

In one embodiment, a system is provided. The system includes a hybrid sensor array configured to be deployed in a borehole environment. The hybrid sensor array includes multiple fiber-optic sensors configured to measure strain fields and multiple particle motion sensors configured to measure particle motions in response to a seismic wavefield traveling along the hybrid sensor array. The seismic wavefield is produced by a seismic source. The system also includes a control system that includes an interrogator, a seismic recorder, a memory, and one or more processors. The interrogator includes a light source and a light recorder. The light source is configured to provide source light signals for the multiple fiber-optic sensors. The light recorder is configured to receive light signals associated with measured strain fields from the multiple fiber-optic sensors and convert the light signals into fiber sensor data. The seismic recorder is configured to receive and convert the particle motions into particle motion data. The memory stores instructions that, when executed by the one or more processors, cause the one or more processors to receive the fiber sensor data from the light recorder, receive the particle motion data from the seismic recorder, estimate calibrated strain data based on the fiber sensor data and the particle motion data, estimate first particle velocity data based on the calibrated strain data, merge the first particle velocity data and the particle motion data into second particle velocity data, process the second particle velocity data as single-component particle motion data, and output the second particle velocity data as the single-component particle motion data.

In another embodiment, a method is provided. The method includes receiving fiber sensor data acquired by multiple fiber-optic sensors and particle motion data acquired by multiple particle motion sensors. The multiple fiber-optic sensors and the multiple particle motion sensors are included in a hybrid sensor array distributed in a borehole. The method also includes estimating calibrated strain data based on the fiber sensor data and the particle motion data, estimating first particle velocity data based on the calibrated strain data, merging the first particle velocity data and the particle motion data into second particle velocity data, processing the second particle velocity data as single-component particle motion data, and outputting the second particle velocity data as the single-component particle motion data.

In yet another embodiment, a system is provided. The system includes one or more processors located in a control system configured to control operations of a hybrid sensor array deployed in a borehole environment. The hybrid sensor array includes multiple fiber-optic sensors and multiple particle motion sensors distributed. The system also includes a memory storing instructions that, when executed by the one or more processors, cause the one or more processors to receive fiber sensor data acquired by the multiple fiber-optic sensors and particle motion data acquired by the multiple particle motion sensors, estimate calibrated strain data based on the fiber sensor data and the particle motion data, estimate first particle velocity data based on the calibrated strain data, merge the first particle velocity data and the particle motion data into second particle velocity data, process the second particle velocity data as single-component particle motion data, and output the second particle velocity data as the single-component particle motion data.

BRIEF DESCRIPTION OF THE DRAWINGS

Various aspects of this disclosure may be better understood upon reading the following detailed description and upon reference to the drawings in which.

DETAILED DESCRIPTION

Figure 1:
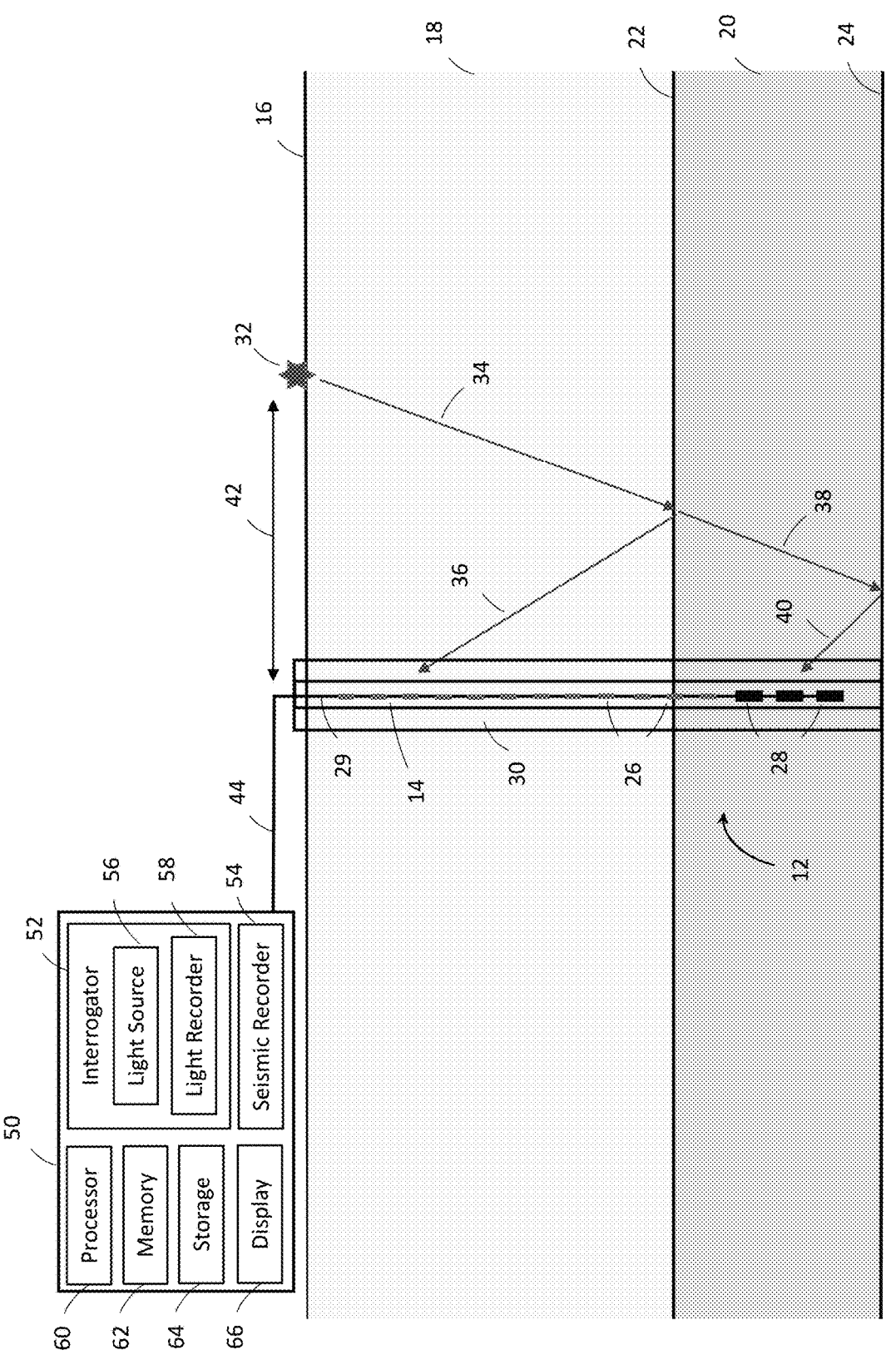
FIG. 1 illustrates a schematic diagram of a fiber-optic and geophone hybrid sensor array in a wireline deployment, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and operation-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

In seismic sensing, near-surface seismic monitoring may have insufficient spatio-temporal resolutions caused by a limited seismic sensor density (e.g., limited by deployment difficulties or cost effectiveness). Recent development of optical fiber-based seismic sensing technologies such as Distributed Acoustic Sensing (DAS) transforms fiber-optic cables into dense seismic sensor arrays, therefore providing the oil and gas industry with new options for seismic sensing. For instance, the DAS may provide higher sensor count, more flexible deployment, and long-term operation capability in comparison to particle motion sensors such as geophones and accelerometers. In some embodiments, the DAS may include heterodyne Distributed Vibration Sensing (hDVS) that may enable new high-performance applications such as efficiently conducting borehole seismic and flow profiling applications.

The Distributed Acoustic Sensing (DAS) may be used in various geophysical applications such as borehole seismic, surface seismic, shallow wellbore seismic, and so on. For example, DAS-based seismic acquisition systems may be used in borehole seismic to measure borehole seismic data for applications such as reservoir characterization and micro-seismic. The borehole seismic data may include seismic data (e.g., P-waves, S-waves, converted waves) measured using receivers (e.g., seismic sensors), sources (e.g., dynamite or vibrator sources), or both in a well (e.g., a cased well or an open well). By directly measuring seismic velocities of geological formations encountered in the well, the well logs and borehole seismic data may be correlated to surface seismic data with improved accuracy and efficiency. The borehole seismic data may be measured by DAS systems during or after drillings of exploration and appraisal wells. Combined with surface seismic data, the borehole seismic data may be used to calibrate and improve imaging reservoir features around a borehole. In some cases, subsurface imaging may use 3D vertical seismic profile (VSP) technology for improved imaging quality (e.g., high resolutions). The DAS systems may reduce VSP acquisition time from a few hours (e.g., using conventional seismic operations) to a few minutes. In some embodiments, the DAS-based seismic acquisition systems may be used in surface seismic to measure surface seismic data. For example, optical sensors based on the DAS may be positioned on the ground or on a water bottom while particle motion sensors may be positioned in the same area. Data measured by the optical sensors may be used to calibrate data measured by the particle motion sensors.

In some embodiments, a fiber-optic and particle motion sensor (e.g., geophone or accelerometer) hybrid sensor array may be used in geophysical applications. Fiber-optic sensors in the hybrid sensor array may be based on the DAS. Although both the fiber-optic sensors and particle motion sensors measure seismic wavefields, they measure different domains of the same wavefields. For example, the fiber-optic sensors may measure strains caused by seismic waves traveling along the hybrid sensor array. In comparison to the fiber-optic sensors, the particle motion sensors may measure the particle velocity or acceleration as particle movement caused by seismic waves traveling along the hybrid sensor array. Therefore, merging fiber-optic data and particle motion data and processing merged data becomes a challenge for using the hybrid sensor array in the geophysical applications. For example, theoretically particle velocity data may be inverted from fiber-optic data by deconvolving the strain responses in the fiber-optic data and then merging the inverted particle velocity data with the geophone dataset. A response function used in the inversion process usually assumes that the optical fiber containing the fiber-optic sensors is perfectly coupled to the formations (e.g., with a coupling coefficient equal to 1) or the coupling coefficient is known or measured. However, such assumption may not be valid in practice because the optical fiber may be deployed in various configurations where perfect coupling may not be achieved or the coupling coefficient may not be measured.

As discussed in greater detail below, the present embodiments described herein provide a method to reconstruct particle velocity wavefields from coupling-calibrated fiber-optic data that subsequently enables physically valid and exact construction of the particle velocity wavefields for a hybrid sensor array including both fiber-optic and geophone sensors. In addition, the disclosed method is applicable to any type of borehole geophysical applications such as structure and reservoir imaging, impedance inversion, attenuation tomography, micro-seismic fracture imaging, focal mechanism analysis, and so on. In some embodiments, the disclosed method is also applicable to other applications such as geothermal, carbon capture, utilization and storage (CCUS), hydrogen storage, waste monitoring and storage, and $CO_2$ storage monitoring.

A calibrated true particle velocity dataset has critical importance for geophysics workflow using fiber optics-geophone hybrid array. Domains benefiting are among others traditional borehole seismic products (e.g., vertical seismic profiling (VSP) in its various acquisition geometries), microseismic monitoring in its various acquisition geometries and crosswell seismic. Imaging is one example of applications, and it is applied for VSP and cross-well configurations. The imaging is a backpropagation process of seismic data from receiver locations into space. Data from a large amount of receivers may be used for the imaging. An image condition is based on an assumption that that the data from all receivers are in the same domain. Such condition may be automatically fulfilled using the calibrated true particle velocity dataset. Full-wave inversion method is another example of applications. The disclosed method is also applicable to VSP, cross well, and microseismic configurations. Velocity models and attenuations are inverted from true amplitude seismic data and used for reservoir imaging and reservoir characterizations. Since the disclosed method uses an amplitude directory for computation of objective function, all data are assumed to be in the same domain. Such assumption may be automatically fulfilled using the calibrated true particle velocity dataset. In addition, magnitudes and mechanisms of a passive seismic source are inverted in the microseismic monitoring. As such, the calibrated true particle velocity dataset is desired.

With the preceding in mind, turning now to the figures, FIG. 1 illustrates a schematic diagram of a fiber-optic and geophone hybrid sensor array in a wireline deployment. A hybrid sensor array 12 may be deployed in a borehole 14 that is drilled from a surface 16 into the underground formed by subsurface layers such as a first subsurface layer 18, a second subsurface layer 20, and other subsurface layers beneath. A reflector (or boundary) is formed between each pair of adjacent subsurface layers. For examples, a first reflector 22 is formed between the first subsurface layer 18 and the second subsurface layer 20, and a second reflector 24 is formed between the second subsurface layer 20 and another subsurface layer beneath the second subsurface layer 20.

The hybrid sensor array 12 may include fiber-optic sensors 26 and geophone sensors 28. The fiber-optic sensors 26 may measure strains caused by seismic wavefields traveling along the hybrid sensor array 12. For example, an optical fiber cable 29 may enclose the fiber-optic sensors 26 to provide protections in a harsh borehole environment. An interrogator 52 may provide a light source (e.g., laser) and light detections (e.g., detections of back scattered light signals from the fiber-optic sensors 26). The optical fiber cable 29, the interrogator 52, and the other relevant devices or components (e.g., power supplies, control circuitry, cables) may form a Rayleigh scattering based Distributed Acoustic Sensing (DAS) system, which may use the optical fiber cable 29 to provide a distributed strain sensing. That is, the optical fiber cable 29 may become a sensing element, therefore enabling higher sensor count (e.g., densely distributed fiber-optic sensors 26), more flexible deployment (e.g., flexibility of the optical fiber cable 29), and long-term operation capability (e.g., durability of the optical fiber cable 29) in comparison to other seismic sensors such as geophones and accelerometers. The DAS system may enable acoustic frequency strain signals to be detected over large distances (e.g., a length of the well) and in harsh environments (e.g., a borehole environment).

Using the DAS system may improve efficiencies of borehole seismic operations and reduce operational cost. Certain conventional borehole seismic tools may no longer be used in the borehole seismic operations. For example, operations like rigging loggers up and down along the borehole 14 may be eliminated or reduced as the fiber-optic sensors 26 are stationary in the borehole 14 while recording strains in conjunction with other stationary logging devices.

The optical fiber cable 29 may include one or more optical fibers on which the fiber-optic sensors 26 are distributed. The one or more optical fibers may be single mode or multi-mode optical fibers. In one embodiment, the fiber-optic sensors 26 may be integrated into the one or more optical fibers using technologies such as distributed Bragg reflector (DBR) that may cause a partial reflection of an optical wave along the optical fiber cable 29. The optical fiber cable 29 may include one or more claddings to provide protections for the one or more optical fibers.

The geophone sensors 28 may measure ground motions (e.g., particle movements such as velocity and acceleration) caused by seismic wavefields traveling along the hybrid sensor array 12. For example, the geophone sensors 28 may detect ground motions and transforms the motions into electrical impulses. Each of the geophone sensors 28 may detect motions in one direction. Multi-component geophone sensors (e.g., three-component (3C) geophone sensors) may detect motions in multiple directions (e.g., three mutually orthogonal directions such as X, Y, and Z in a Cartesian coordinate system).

It should be noted that the illustrated configuration of fiber-optic sensors 26 and geophone sensors 28 is an example of the hybrid sensor array 12. Different sensor configurations may be used to form the hybrid sensor array 12. In some embodiments, the fiber-optic sensors 26 may be distributed separately from the geophone sensors 28 (e.g., above or below) along the optical fiber cable 29. In some embodiments, the fiber-optic sensors 26 and the geophone sensors 28 may be mixed along the optical fiber cable 29 (e.g., individual or group of sensors from the fiber-optic sensors 26 and the geophone sensors 28 distributed alternatively).

The borehole 14 may be surrounded by borehole casings 30. The borehole 14 may refer to a drilling well inside a wellbore wall or a rock face that bounds the drilling well. The borehole 14 may be a cased well or an open well. The borehole casings 30 may include pipes lowered into an open well and cemented in place. The borehole casings 30 may be configured to withstand a variety of forces, such as collapse, burst, and tensile, as well as chemically aggressive brines.

During a borehole seismic acquisition, a source 32 may be activated to generate a seismic wavefield 34 traveling downward into the subsurface layers. When the seismic wavefield 34 arrives at the first reflector 22, a portion of seismic energy contained in the seismic wavefield 34 is reflected by the first reflector 22. A first reflected wavefield 36 travels upward and arrives at the hybrid sensor array 12, where it is measured by a corresponding sensor (e.g., one of the fiber-optic sensors 26). Another portion of the seismic energy contained in the seismic wavefield 34 transmitted through the first reflector 22 into the second subsurface layer 20. A transmitted wave-field 38 travels downward and arrives at the second reflector 24, where a portion of seismic energy contained in the transmitted wavefield 38 is reflected by the second reflector 24. A second reflected wavefield 40 travels upward and arrives at the hybrid sensor array 12, where it is measured by another corresponding sensor (e.g., one of the geophone sensors 28). An offset 42 may represent a distance between the source 32 and a location (e.g., an entrance of the borehole 14) where the hybrid sensor array 12 is lowered into the borehole 14.

It should be noted that the illustrated source 32 is an example of a seismic source deployment. Different source deployment may be employed during the borehole seismic acquisition. In some embodiments, the source 32 may be a vibrator transported by a truck. In some embodiments, the source 32 may be dynamite buried at a certain depth (e.g., 5 meters).

The hybrid sensor array 12 may be connected to a wireline cable 44, which may be further connected to a control system 50. The control system 50 may be configured to control operations of the hybrid sensor array 12, provide certain signal sources (e.g., light source for the fiber-optic sensors 26), receive and process the data acquired by the hybrid sensor array 12. In some embodiments, the control system 50 may also be configured to control operations of the source 32 (e.g., synchronizing the source activations and corresponding data recording).

The control system 50 may include the interrogator 52, a seismic recorder 54, a processor 60, a memory 62, a storage 64, and a display 66. The interrogator 52 may receive light signals from the fiber-optic sensors 26 and convert the light signals into fiber sensor data. The seismic recorder 54 may receive electrical signals from the geophone sensors 28 and convert the electrical signals into geophone data. The processor 60 may receive the fiber sensor data and the geophone data. Data analysis and data processing based on received data may be executed by the processor 60 using processor-executable code stored in the memory 62 and the storage 64. The analyzed and processed data may be stored in the storage 64 for later usage. Analytic and processing results may be displayed via the display 66. Based on the analytic and processing results, the processor 60 may adjust operations of the interrogator 52, the seismic recorder 54, or the source 32 (e.g., via a communication interface) to adjust the borehole seismic acquisition. In some embodiments, the processors 60 may generate notification to users (e.g., well operators) based on the analytic and processing results via the communication interface.

As mentioned above, the interrogator 52 may include a light source 56 that may provide source light signals (e.g., laser impulses) for the fiber-optic sensors 26. For example, the light source 56 may include wavelength tunable lasers (e.g., semiconductor lasers), such as distributed Bragg reflector (DBR) laser, vertical cavity surface-emitting laser (VCSEL), external cavity laser, distributed feedback (DFB) laser, or other suitable lasers.

The interrogator 52 may also include a light recorder 58 that may receive light signals (e.g., back scattered light signals associated with local measurement of dynamic strains caused by incident seismic wavefields) from the fiber-optic sensors 26, convert the light signals to electrical signals (e.g., using photodetectors), and further convert (e.g., digitalize) the electrical signals into the fiber sensor data. The photodetectors may include a PIN photodiode (e.g., InGaAs PIN, GaAs PIN, or Si PIN), an avalanche photodiode (e.g., InGaAs avalanche, GaAs avalanche, or Si avalanche), or other suitable photodetector (e.g., Schottky, GaP, Ge, InAs, InAsSb, or HgCdTe photodiode).

The processor 60 may be any type of computer processor or microprocessor capable of executing computer-executable code. The processors 60 may include single-threaded processor(s), multi-threaded processor(s), or both. The processors 60 may also include hardware-based processor(s) each including one or more cores. The processors 60 may include general purpose processor(s), special purpose processor(s), or both. The processors 60 may be communicatively coupled to other internal components (such as interrogator 52, seismic recorder 54, memory 62, storage 64, and display 66).

The memory 62 and the storage 64 may be any suitable articles of manufacture that can serve as media to store processor-executable code, data, or the like. These articles of manufacture may represent computer-readable media (e.g., any suitable form of memory or storage) that may store the processor-executable code used by the processor 60 to perform the presently disclosed techniques. The memory 62 and the storage 64 may also be used to store data described (e.g., fiber sensor data, geophone data), various other software applications for data analysis and data processing. In some embodiments, the memory 62 and the storage 64 may include one or more databases to store additional data such as historical data (borehole seismic data acquired in previous operations) that may be used for borehole seismic monotoring. The memory 62 and the storage 64 may represent non-transitory computer-readable media (e.g., any suitable form of memory or storage) that may store the processor-executable code used by the processor 60 to perform various techniques described herein. It should be noted that non-transitory merely indicates that the media is tangible and not a signal.

The display 66 may operate to depict visualizations associated with software or executable code being processed by the processor 60. In an embodiment, the display 66 may be a touch display capable of receiving inputs from a user (e.g., a well operator or a data processor) of the control system 50. The display 66 may be any suitable type of display, such as a liquid crystal display (LCD), plasma display, or an organic light emitting diode (OLED) display, for example. Additionally, in an embodiment, the display 66 may be provided in conjunction with a touch-sensitive mechanism (e.g., a touch screen) that may function as part of a control interface for the control system 50.

It should be noted that the components described above with regard to the control system 50 are example components and the control system 50 may include additional or fewer components as shown.

Figure 2:
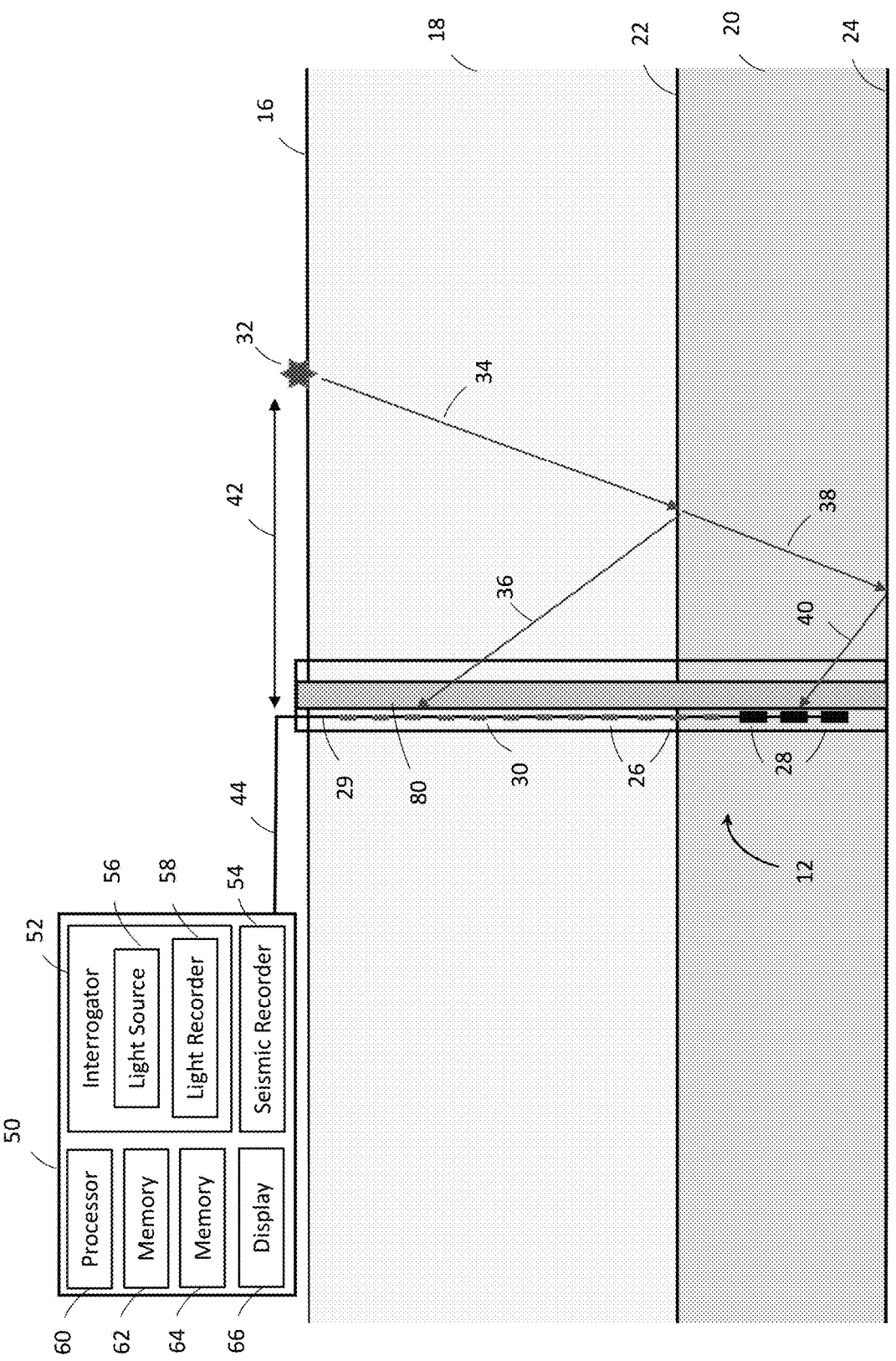
FIG. 2 illustrates a schematic diagram of the fiber-optic and geophone hybrid sensor array in a completion deployment, in accordance with an embodiment.

Besides a deployment illustrated in FIG. 1, the hybrid sensor array 12 may be deployed in other locations to acquire the borehole seismic data. For example, FIG. 2 illustrates a schematic diagram of the hybrid sensor array 12 in a completion deployment. The completion deployment may be used in a well completion, which is a process of configuring a well ready for a production (e.g., oil or gas) or an injection (e.g., $CO_2$ injection). For example, the well completion may include running in production tubing 80 and associated downhole tools as well as perforating and stimulating. The hybrid sensor array 12 may be coupled to the production tubing 80.

Figure 3:
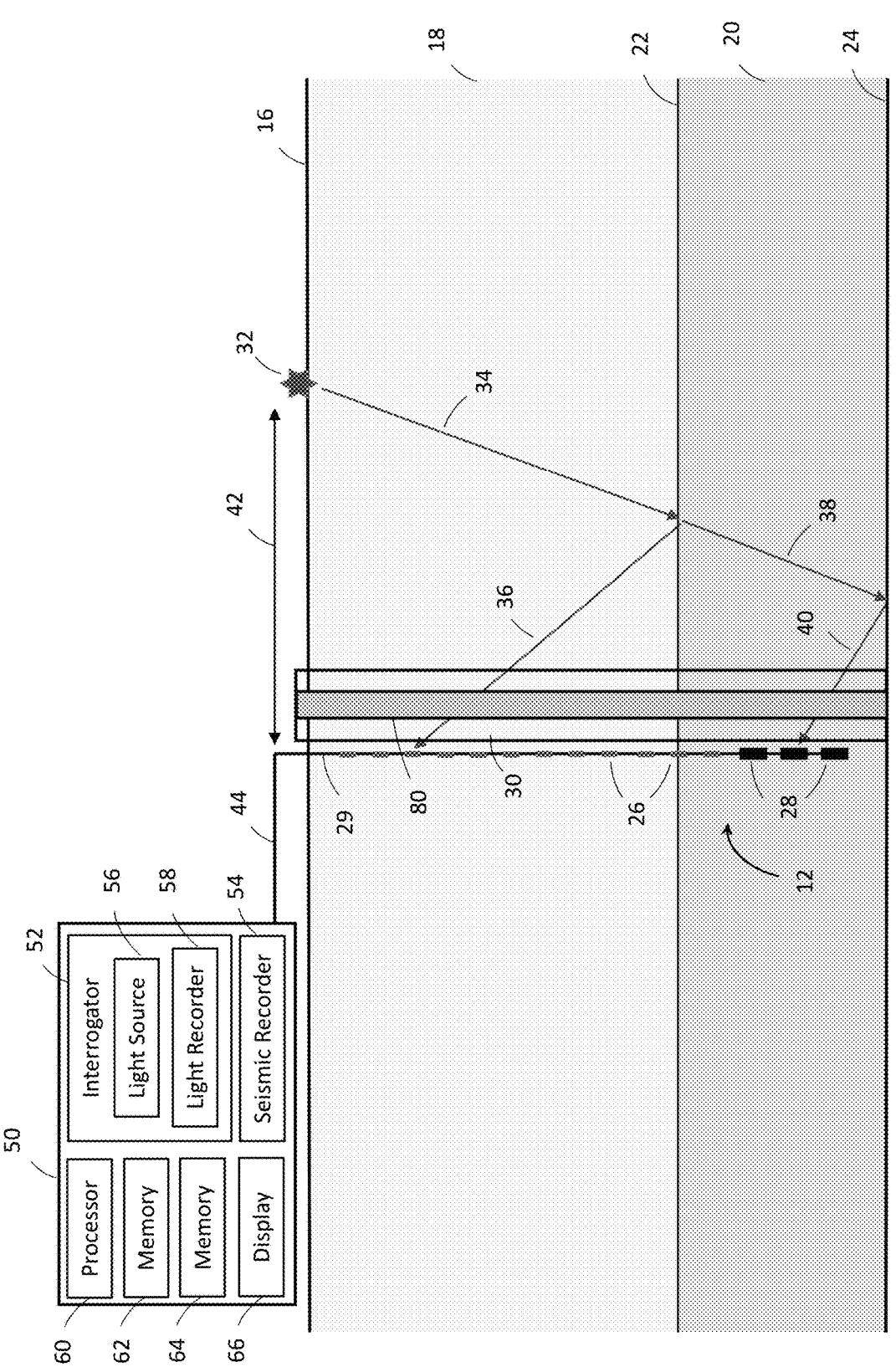
FIG. 3 illustrates a schematic diagram of the fiber-optic and geophone hybrid sensor array in a permanent deployment, in accordance with an embodiment.

For another example, FIG. 3 illustrates a schematic diagram of the hybrid sensor array 12 in a permanent deployment. The permanent deployment may be used in a production well after the well completion. The hybrid sensor array 12 may be permanently cemented behind the borehole casings 30.

As mentioned previously, the fiber-optic sensors 26 and the geophone sensors 28 measure different domains of a seismic wavefield traveling along the hybrid sensor array 12. For example, the fiber-optic sensors 26 may measure a strain field caused by the seismic wavefield, while the geophone sensors 28 may measure a particle velocity wavefield caused by the seismic wavefield. Merging two different types of data including fiber sensor data and geophone data and processing merged data may be challenging.

Figure 4:
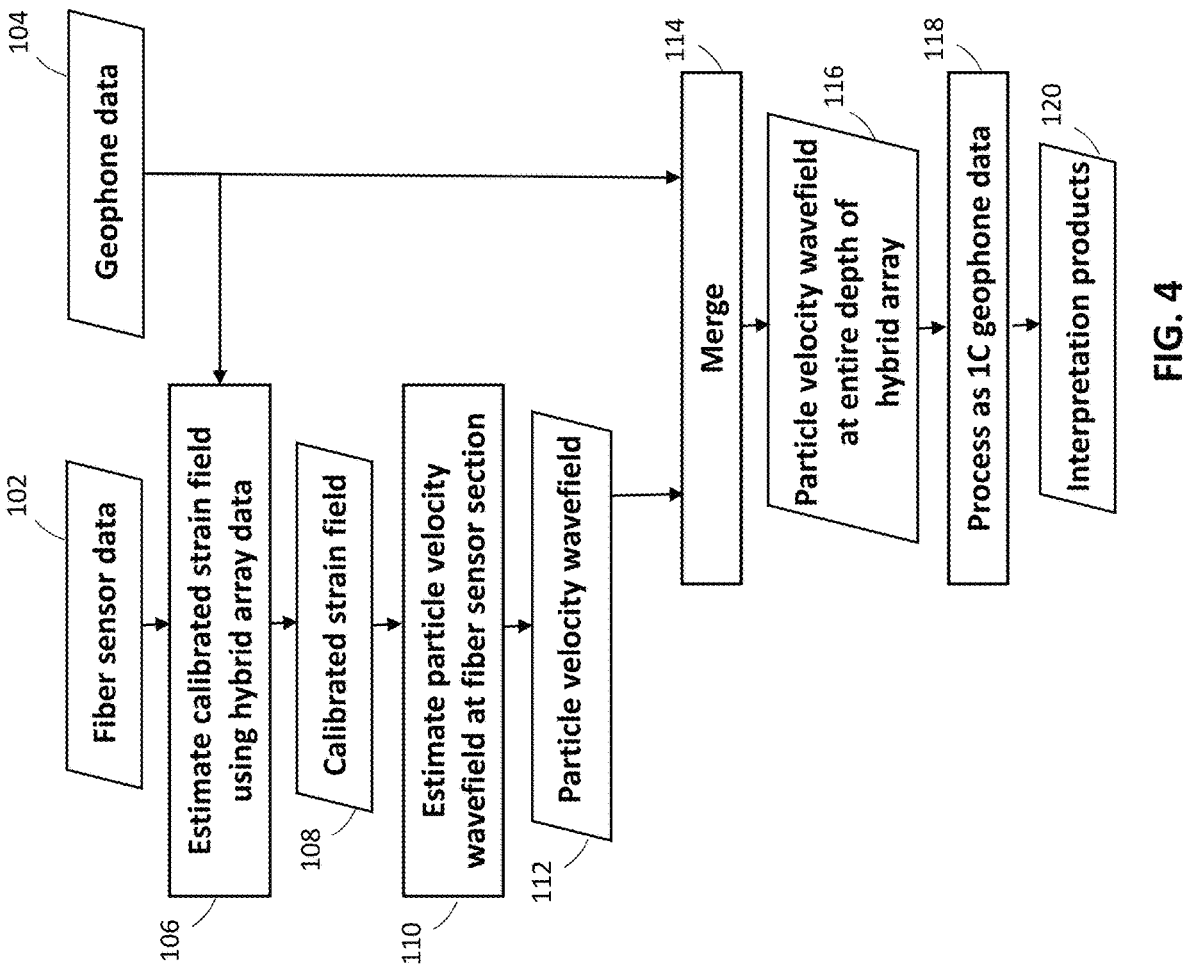
FIG. 4 illustrates a flow chart of a process for processing data acquired by the fiber-optic and geophone hybrid sensor array, in accordance with an embodiment.

FIG. 4 illustrates a flow chart of a process for processing data acquired by the hybrid sensor array 12. The data acquired by the hybrid sensor array 12 may be referred to as hybrid array data, which includes fiber sensor data 102 and geophone data 104. In present embodiment, the fiber-optic sensors 26 may be a part of a Distributed Acoustic Sensing (DAS) system that is used to acquire the fiber sensor data 102 that is associated with a strain field caused by a seismic wavefield. The theory of data processing described below may be applied to other embodiments using different acquisition systems to acquire optical sensor data and particle motion data.

At process block 106, the processor 60 of the control system 50 may estimate a calibrated strain field 108 using the hybrid array data.

We consider the strain field ε along the hybrid array. Assuming the strain field ε at the local section of a fiber sensor in the hybrid array can be expressed as a superposition of N plane-waves (plane wave approximation) which propagate in a local section of the hybrid array, the strain field ε (fiber sensor data 102) can be expressed as $$\varepsilon(z, \omega) = \sum\nolimits_{n=1}^{N} (E(\omega)_n \exp(i\omega s_n z)), \tag{1}$$

where z is depth of measurement point of strain in the hybrid array, E is amplitude of each plane wave in strain, s is slowness, and ω is angular frequency. Equation (1) can be written as per the below linear form at a given frequency ω:

$$\varepsilon_i = G_{in} E_n. \tag{2}$$

Therefore a strain amplitude of nth plane wave $E_n$ can be expressed as $$E_n = G_{in}^{-g} \varepsilon_i, \tag{3}$$

where a matrix G is a forward kernel for a receiver i (e.g., a fiber-optic sensor) for nth plane wave, −g means generalized inverse, and ε is strain field at the receiver i. By solving the equation (3), we invert E: the amplitude of each plane waves. Substituting the solution of (3) into equation (1), we estimate the modeled strain field $\varepsilon_m(z,\omega)$. Since we assumed the strain field is explained by superposition of the plane waves, we anticipate following relation:

$$\varepsilon(z, \omega) \sim \varepsilon_m(z, \omega). \tag{4}$$

-continued

Therefore, $$(\varepsilon(z, \omega) \sim \varepsilon_m(z, \omega)) \sim 0, \tag{5}$$

where norm is a residual that may be used to evaluate the difference between ε(z,ω) and $\varepsilon_m$(z,ω).

We assume DAS measures strain field ε in an ideal configuration (i.e., no coupling issues). Therefore DAS data (fiber sensor data) d can be expressed as the following equation (6) referring equation (3).

$$d(z, \omega) = \sum\nolimits_{n=1}^{N} (D(\omega)_n \exp(i\omega s_n z)). \tag{6}$$

In practice, however, a coupling issue may exist in the fiber sensor data 102. Therefore, equation (6) does not represent the DAS measurement d because the plane wave approximation is violated due to the coupling issue. Instead, we anticipate following equation is established using calibrated DAS measurement d'.

$$d'(z, \omega) = \sum\nolimits_{n=1}^{N} (D'(\omega)_n \exp(i\omega s_n z)) \tag{7}$$

and amplitude D can be estimated by $$D_n' = G_{in}^{-g} d_i'. \tag{8}$$

$$norm(d'(z, \omega) - dm'(z, \omega)) \to 0, \tag{9}$$

where dm'(z,ω) is modeled calibrated DAS measurement computed by substituting the solution of (8) into equation (7).

Assuming the calibrated DAS measurement d' can be expressed as $$d'(z, \omega) = \alpha(z)d(z, \omega), \tag{10}$$

where α is a calibration factor.

In one example, the DAS measurement d is the fiber sensor data 102 and the calibrated DAS measurement d' is the calibrated strain field 108. The following steps may be used in an inversion to estimate the calibration factor α(z): 1) set α(z)=1 as initial guess of calibration factor; 2) compute dm' (z,ω) using equation (8); 3) evaluate the residual (equation 9); 4) update the calibration factor α(z); and 5) back to step 2) to continue steps 2)-4) until equation (9) is satisfied (e.g., the residual is minimized). From the steps described above, the calibrated DAS measurement d' is estimated.

A calibration point to constrain the inversion may be used to solve the above equations. The strain field data provided by geophone 104 in a hybrid array provides a calibration point of strain. The strain field $\varepsilon_g$ at depth z of geophone in the hybrid array may be expressed as $$\varepsilon_g(z, \omega) = v(z, \omega)/c, \tag{11}$$

where c is apparent velocity and v is particle velocity measured by the geophone sensor. There are different methods to constrain the inversion using $\varepsilon_g$. In one embodiment, we use $\varepsilon_g$ as constraint to solve the inversion of $\alpha(z)$ by adding $\varepsilon_g$ into equation (8) as follows:

$$d_c'(z, \omega) = \begin{bmatrix} d'(z, \omega) \\ \varepsilon_g(z, \omega) \end{bmatrix} = \sum_{n=1}^{N} (D'(\omega)_n \exp(i\omega s_n z)) \quad (12)$$

$$D_n' = G_{in}^{-g} d_{c_i} \quad (13)$$

and perform the inversion step described above. For example, strain field(s) estimated from one or more geophone sensors 28 may be used based on equation (11). The use of the hybrid sensor array 12 enables calibrating the response of fiber-optic sensors 26.

Based on the calibrated strain filed 108, the processor 60 may estimate a particle velocity wavefield 112 at fiber sensor section (process block 110). That is, the calibrated strain field 108 may be inverted to the particle velocity wavefield 112. There are different methods to perform the inversion. In one embodiment, similar to the fiber sensor data 102, particle velocity wavefield v may be expressed as $$v(z, \omega) = \sum_{n=1}^{N} (V(\omega)_n \exp(i\omega s_n z)). \quad (13)$$

Using equation (11), the particle velocity wavefield v may be estimated from the calibrated strain filed 108:

$$v_m(z, \omega) = \sum_{n=1}^{N} (\varepsilon(\omega)_n \exp(i\omega s_n z)/s_n). \quad (14)$$

Examples of the particle velocity wavefield 112 estimated by using calibrated strain field 108 and equation (14) will be discussed in detail below with reference to FIGS. 5A-5C.

At process block 114, the processor 60 may merge the particle velocity wavefield 112 and the geophone data 104 to generate a particle velocity wavefield 116 at entire depth of the hybrid sensor array 12. The processor 60 may process the particle velocity wavefield 116 as particle velocity data such as single-component (1C) geophone data (process block 118). The data processing may include trace edit, geometry assignment, anti-alias filtering, gain recovery, deconvolution, statics, de-noise, normal moveout correction, stack, and so on. The processor 60 may output processed data as the single-component (1C) geophone data.

The processed data may be used for seismic migration, interpretation, reservoir characterization, or other geophysical applications. The processing results may be similar to the results using three-component (3C) geophone data. In some embodiments, the processed data may be used to calibrate other seismic data (e.g., surface seismic data) in terms of travel times and amplitudes. In some embodiments, the processed data may be used to calibrate parameters (e.g., velocity, anisotropy, attenuation) in a velocity model. The calibrated seismic data or velocity model may be used as an input to seismic migration tools to produce high resolution images of geological formations that may contain materials of interest, such as hydrocarbon reserves. The high-resolution images of the geological formations may be used for seismic interpretation, resulting in interpretation products 120. For example, the interpretation products 120 may include subsurface imaging results using the particle velocity wavefield 116 and other input data (e.g., 3C geophone data), which will be discussed in detail below with reference to FIGS. 6A-6C. The interpretation products 120 may enable more accurate drillings into a particular area having potential hydrocarbon deposits or increased hydrocarbon productions in a particular area having existing hydrocarbon reservoirs.

Figures 5A, 5B, 5C:
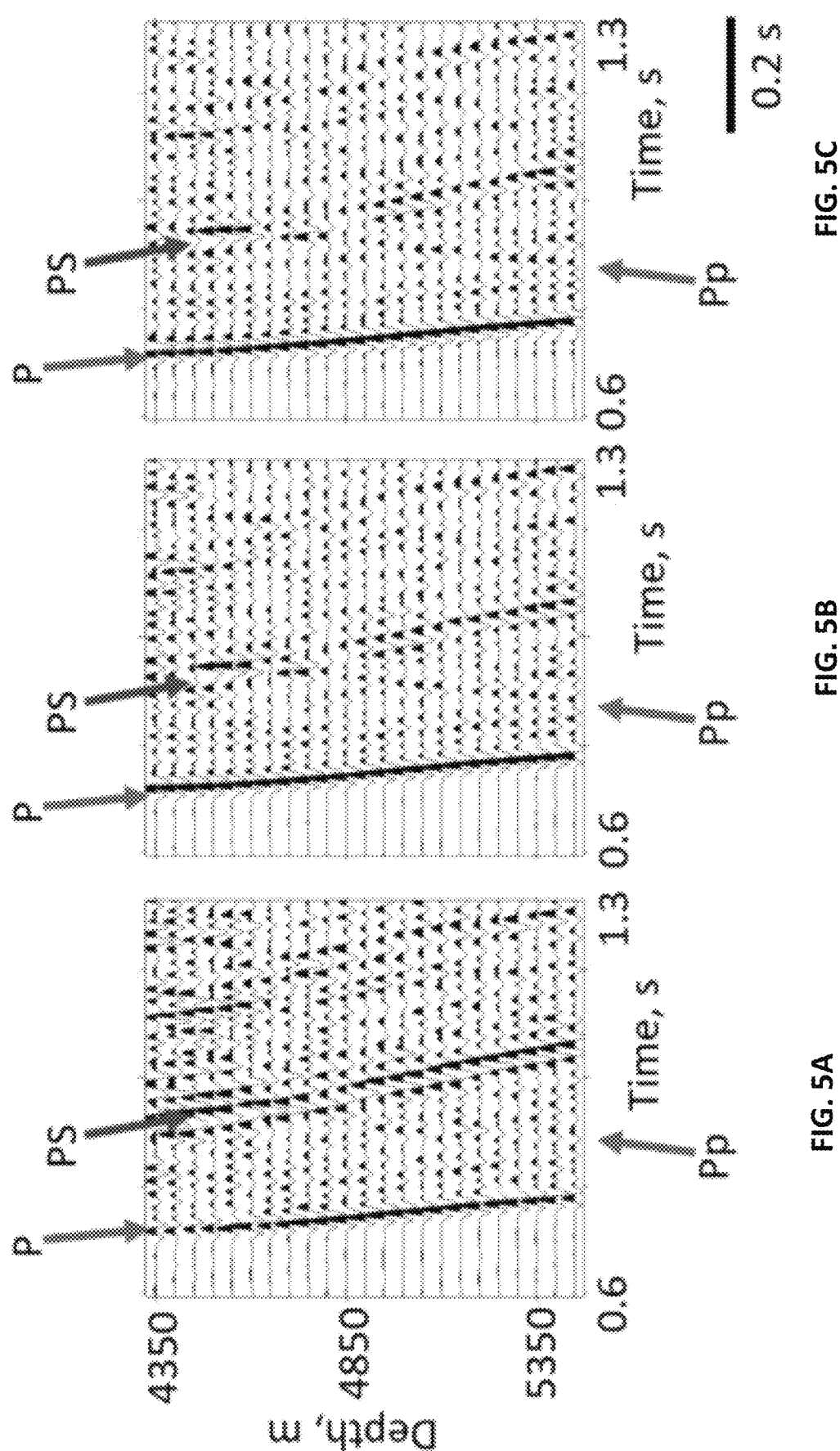
FIG. 5A illustrates an example of a common shot gather of true strain data, in accordance with an embodiment.
FIG. 5B illustrates an example of a common shot gather of geophone data, in accordance with an embodiment.
FIG. 5C illustrates an example of a common shot gather of a particle velocity wavefield inverted from the strain data of FIG. 5A, in accordance with an embodiment.

With the foregoing in mind, FIGS. 5A-5C illustrate example common shot gathers of different types of data described above. These different types of data correspond to the same seismic wavefield. Waveforms shown in each figure are in wiggle trace display that shows signal amplitudes versus time as an oscillating line about a null point. The signal amplitudes are normalized on trace basis. Horizontal axes represents travel time that may be measured from a start time (e.g., time of activating the source 32 to generate the seismic wavefield 34 to a measurement time when the seismic wavefield 34 arrives at a corresponding sensor (e.g., one of the fiber-optic sensors 26 or the geophone sensor 28). The vertical axes represent depth that may be measured from the surface 16 or an entrance of the borehole 14 to the corresponding sensor. These data examples are far-offset data (e.g., offset to depth ratio is approximately 1.3), primary wave (P wave), reflected P-wave (PP wave), and converted wave (PS wave) are shown in each figure.

FIG. 5A illustrates an example of a common shot gather of a true strain data. The true strain data corresponds to the calibrated strain field 108 estimated from the fiber sensor data 102 (process block 106).

FIG. 5B illustrates an example of a common shot gather of geophone data. The geophone data may correspond to the geophone data 104 acquired by the geophone sensors 28. The geophone data 104 may be used to calibrate the fiber sensor data 102 (process block 106).

FIG. 5C illustrates an example of a common shot gather of a particle velocity wavefield inverted from the strain data of FIG. 5A. The particle velocity wavefield may corresponds to the particle velocity wavefield 112 estimated from the calibrated strain field 108 at fiber sensor section (process block 110).

Comparing the common shot gathers of FIGS. 5A-5C, the inverted particle velocity wavefield in FIG. 5C is comparable to the geophone data in FIG. 5B. For instance, both amplitudes and polarizations of the P, PP, and PS waves are comparable between FIG. 5B and FIG. 5C. These results may demonstrate the validity of the presently disclosed methods.

Figures 6A, 6B, 6C:
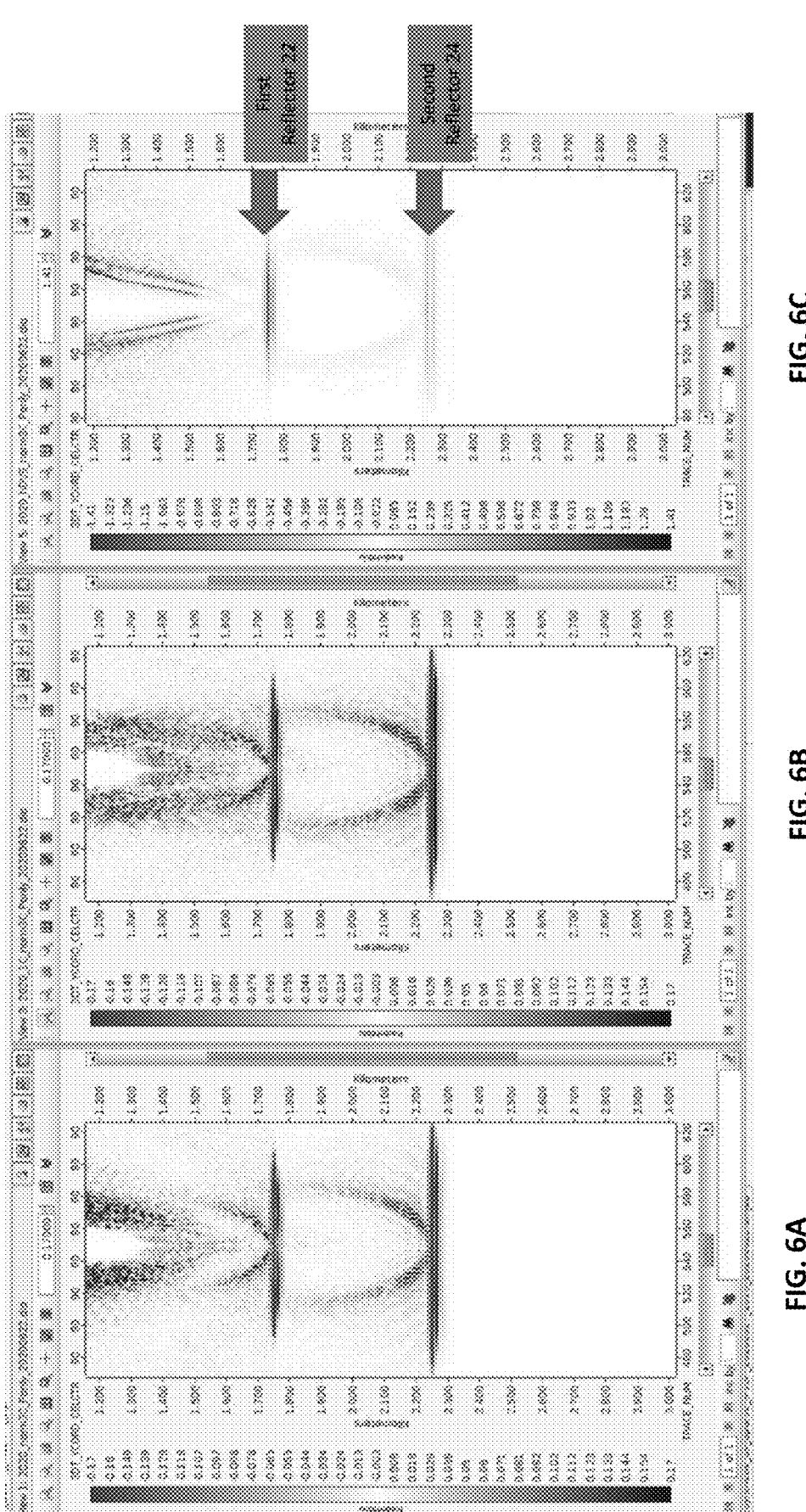
FIG. 6A illustrates an example of a depth migration result from three-component (3C) geophone data, in accordance with an embodiment.
FIG. 6B illustrates an example of a depth migration result from single-component (1C) data derived from data acquired by the fiber-optic and geophone hybrid sensor array, in accordance with an embodiment.
FIG. 6C illustrates an example of a depth migration result from fiber-optic data acquired by fiber-optic sensors, in accordance with an embodiment.

As stated above, the particle velocity wavefield 116 may be used as input data to run depth migrations to generate subsurface images (e.g., images of the first reflector 22 and the second reflector 24 in FIG. 1). For examples, FIGS. 6A, 6B, and 6C illustrate depth migration results using different data inputs. The depth migration is a process by which seismic events are geometrically re-located in space to locations the seismic events occurred in the subsurface rather than the locations that they were recorded at the surface, thereby creating a more accurate image of the subsurface. The depth migration may move dipping reflectors to their true subsurface positions and collapses diffractions, resulting in migrated images that have increased spatial resolutions and resolve areas of complex geology better than non-migrated images.

FIG. 6A illustrates an example of a depth migration result from three-component (3C) geophone data.

FIG. 6B illustrates an example of a depth migration result from single-component (1C) data derived from data acquired by the hybrid sensor array 12.

FIG. 6C illustrates an example of a depth migration result from fiber-optic data acquired by fiber-optic sensors. An image domain DAS correction (e.g., Mateeva et al., 2012, Advances in distributed acoustic sensing (DAS) for VSP: 82nd Annual Meeting, SEG, Expanded Abstracts, https://doi.org/10.1190/segam2012-0739.1, which is incorporated by reference in its entirety for all purposes) is used in this example.

Comparing the images of FIGS. 6A-6C, the migration result from the 1C data (FIG. 6B) shows better similarity with the migration result from 3C geophone data (FIG. 6A) than the migration result from the fiber-optic data (FIG. 6C). For example, in each method, the first reflector 22 and the second reflector 24 are imaged. However, the reflector images in FIG. 6C show an amplitude mismatch from the reflector images in FIG. 6A, while the reflector images in FIG. 6B does not show the mismatch issue. These results may further demonstrate the validity of the presently disclosed methods.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A method, comprising:

receiving fiber sensor data acquired by a plurality of fiber-optic sensors distributed in a borehole;

receiving particle motion data acquired by a plurality of particle motion sensors distributed in the borehole, wherein a hybrid sensor array comprises the plurality of fiber-optic sensors and the plurality of particle motion sensors;

estimating calibrated strain data based on the fiber sensor data and the particle motion data;

estimating first particle velocity data based on the calibrated strain data;

merging the first particle velocity data and the particle motion data into second particle velocity data;

processing the second particle velocity data as single-component particle motion data; and outputting the second particle velocity data as the single-component particle motion data.

2. The method of claim 1, wherein the plurality of fiber-optic sensors is part of a Distributed Acoustic Sensing system or a heterodyne Distributed Vibration Sensing system configured to acquire the fiber sensor data associated with a strain field.

3. The method of claim 1, comprising calibrating the fiber sensor data using the particle motion data as a calibration measurement.

4. The method of claim 3, wherein calibrating the fiber sensor data comprises finding a coupling coefficient, and wherein the calibrated strain data is associated with a product of the coupling coefficient and the fiber sensor data.

5. The method of claim 1, wherein estimating the first particle velocity data comprises an inversion process in which the calibrated strain data is inverted to the first particle velocity data.

* * * * *